June 19, 1923.  1,459,335

H. LEITNER

METAL PROPELLER

Original Filed Feb. 18, 1921

Inventor
Henry Leitner
by George A. Prevost
his attys

Patented June 19, 1923.

1,459,335

UNITED STATES PATENT OFFICE.

HENRY LEITNER, OF LONDON, ENGLAND.

METAL PROPELLER.

Application filed February 18, 1921, Serial No. 446,047. Renewed April 24, 1923.

*To all whom it may concern:*

Be it known that I, HENRY LEITNER, a subject of the King of Great Britain, residing at Regent House, Kingsway, London, England, have invented new and useful Improvements in Metal Propellers, of which the following is a specification.

My invention relates to metal propellers of the kind having separate blades each independently attached to a hub through the medium of a stalk on the said blade which engages a socket in the hub.

In one construction of propeller of this type, the blade stalk is formed as an extension of the laminated sheet-metal constituting the blade, the said laminations being secured between a pair of concentric sleeves. My present invention relates to this form of propeller and comprises improved means for securing the laminations in position.

According to the invention the end of the laminated stalk is thickened in any suitable manner and the outer sleeve may be recessed, chamfered or shaped to receive the thickened end.

In a suitable construction of blade embodying the invention, the thickening of the end of the laminated stalk is effected by the insertion between the laminations of a series of appropriately shaped metal strips, or of metallic fillings, the whole being welded, brazed, or fused up with the outer sleeve. The inner sleeve may be in the form of a short ring, inserted into the end of the laminated stalk or stem which it thus stiffens against compression. Furthermore, the laminations of the stem or stalk may be spot-welded to the outer sleeve along their surface of contact.

To enable the invention to be fully understood I will describe the same by reference to the accompanying drawing, in which:—

*a* indicates the laminations of the stalk of the propeller blade and *b* the outer sleeve to which the laminations are secured by rivets *c*, or they may be secured thereto by spot welding. *d* is a flange on the end of the stalk forming a shoulder to hold the stalk in position in the socket in the hub (not shown) of the propeller. *e* is the inner sleeve in the form of a short ring secured in position within the laminations *a* by rivets *f*.

*g* are the metal strips or fillings which I insert between the laminations at their inner ends, the latter being bent at an angle as indicated, and between the said laminations and the two sleeves. The said strips *g* are of taper form and are welded, brazed or fused in position, as indicated in Figure 1, so as to form a thickening of the end of the stalk whereby it is well keyed in position between the two sleeves so as to withstand the stresses due to centrifugal action when the propeller is rotating at high speeds.

Instead of employing independent metal strips placed in position between the laminations as described, the taper spaces between the laminations may be filled with molten metal and the whole fused together to form a homogeneous whole.

Figure 1:
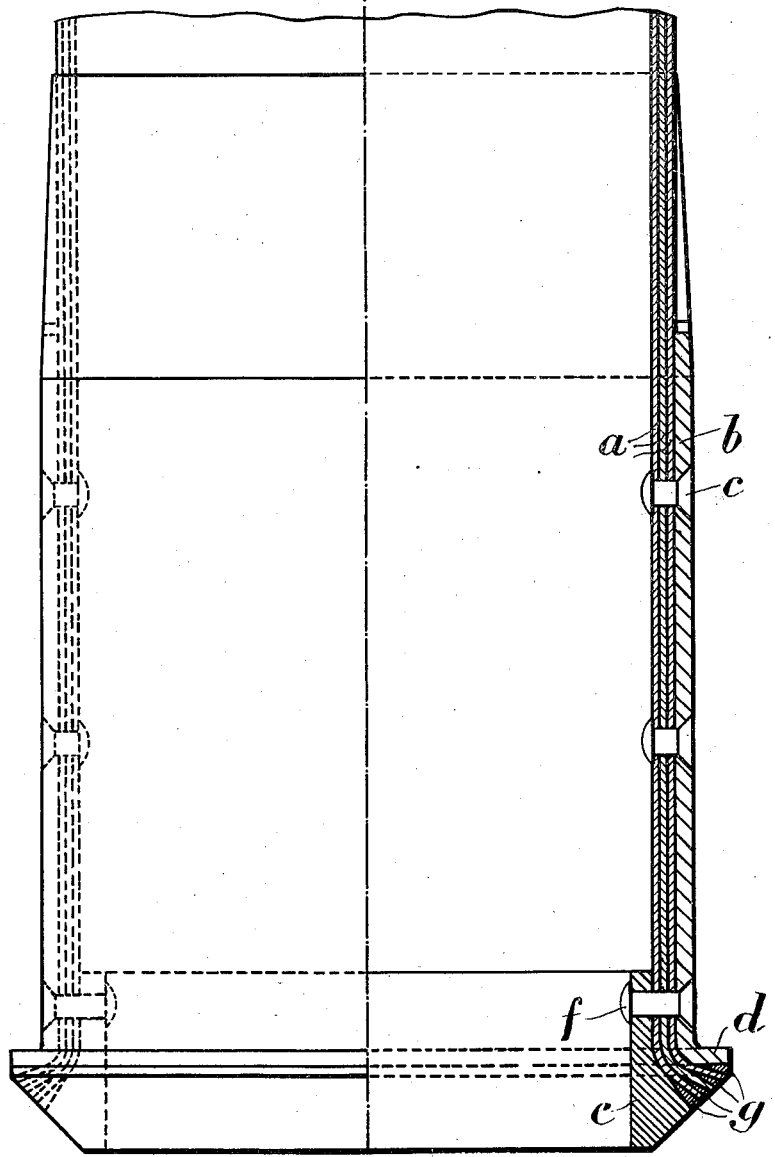
Figure 1 is a sectional elevation of the circular stalk of a metal propeller illustrating one form of my improved construction.
Figure 2:
Figure 2 is a section illustrating another form.

Figure 2 shows a slight variation from the construction shown in Figure 1 in that the ends of the laminations are not bent to such a great angle as in Figure 1 and the outer sleeve is chamfered to fit the thickening of the stalk whilst the inner sleeve is cylindrical on its outer surface instead of being tapered to fit the thickening as in Figure 1.

Claims:

1. A metal propeller comprising a laminated stalk, an outer sleeve and an inner sleeve, and means for securing said laminations to and between said sleeves.

2. A metal propeller as claimed in claim 1, in which the means for securing the laminations to the sleeves consist of rivets.

3. A metal propeller as claimed in claim 1, in which the means for securing the laminations between said sleeves consists in separating the ends of said laminations, filling the spaces between said ends with metal and welding the whole.

4. A metal propeller provided with a laminated stalk, an outer sleeve and an inner sleeve, the said stalk being thickened at its inner extremity.

5. A metal propeller as claimed in claim 4 in which the ends of the laminations are separated, the spaces between the separated ends being filled with metal and means for securing the whole together.

6. A metal propeller as claimed in claim 4, in which the ends of the laminations are separated, the spaces between the separated ends being filled with metal, and the whole welded together.

HENRY LEITNER.